(12) United States Patent
Drummond et al.

(10) Patent No.: US 11,055,930 B1
(45) Date of Patent: Jul. 6, 2021

(54) GENERATING DIRECTIVES FOR OBJECTIVE-EFFECTUATORS

(71) Applicant: Apple Inc., Cupertino, CA (US)

(72) Inventors: Mark Drummond, Palo Alto, CA (US); Siva Chandra Mouli Sivapurapu, Santa Clara, CA (US); Bo Morgan, Emerald Hills, CA (US)

(73) Assignee: APPLE INC., Cupertino, CA (US)

(\*) Notice: Subject to any disclaimer, the term of this patent is extended or adjusted under 35 U.S.C. 154(b) by 0 days.

(21) Appl. No.: 16/862,998

(22) Filed: Apr. 30, 2020

Related U.S. Application Data

(60) Provisional application No. 62/843,861, filed on May 6, 2019.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 10,303,323 | B2* | 5/2019 | Gribetz | ............. G06T 19/20 |
| 2011/0098056 | A1* | 4/2011 | Rhoads | ............. G06K 9/4671 |
| | | | | 455/456.1 |
| 2017/0216675 | A1* | 8/2017 | Goslin | ............. A63F 13/212 |
| 2019/0279425 | A1* | 9/2019 | Yin | ............. G06F 3/04815 |

\* cited by examiner

*Primary Examiner* — Robert J Craddock
(74) *Attorney, Agent, or Firm* — Fernando & Partners, LLP

(57) ABSTRACT

A method includes generating, in coordination with an emergent content engine, a first objective for a first objective-effectuator and a second objective for a second objective-effectuator instantiated in a computer-generated reality (CGR) environment. The first and second objectives are associated with a mutual plan. The method includes generating, based on characteristic values associated with the first and second objective-effectuators a first directive for the first objective-effectuator and a second directive for the second objective-effectuator. The first directive limits actions generated by the first objective-effectuator over a first set of time frames associated with the first objective and the second directive limits actions generated by the second objective-effectuator over a second set of time frames associated with the second objective. The method includes displaying manipulations of CGR representations of the first and second objective-effectuators in the CGR environment in accordance with the first and second directives.

32 Claims, 8 Drawing Sheets

GENERATING DIRECTIVES FOR OBJECTIVE-EFFECTUATORS

CROSS-REFERENCE TO RELATED APPLICATION

This application claims the benefit of U.S. Provisional Patent App. No. 62/843,861, filed on May 6, 2019, which is incorporated by reference in its entirety.

TECHNICAL FIELD

The present disclosure generally relates to generating directives for objective-effectuators.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
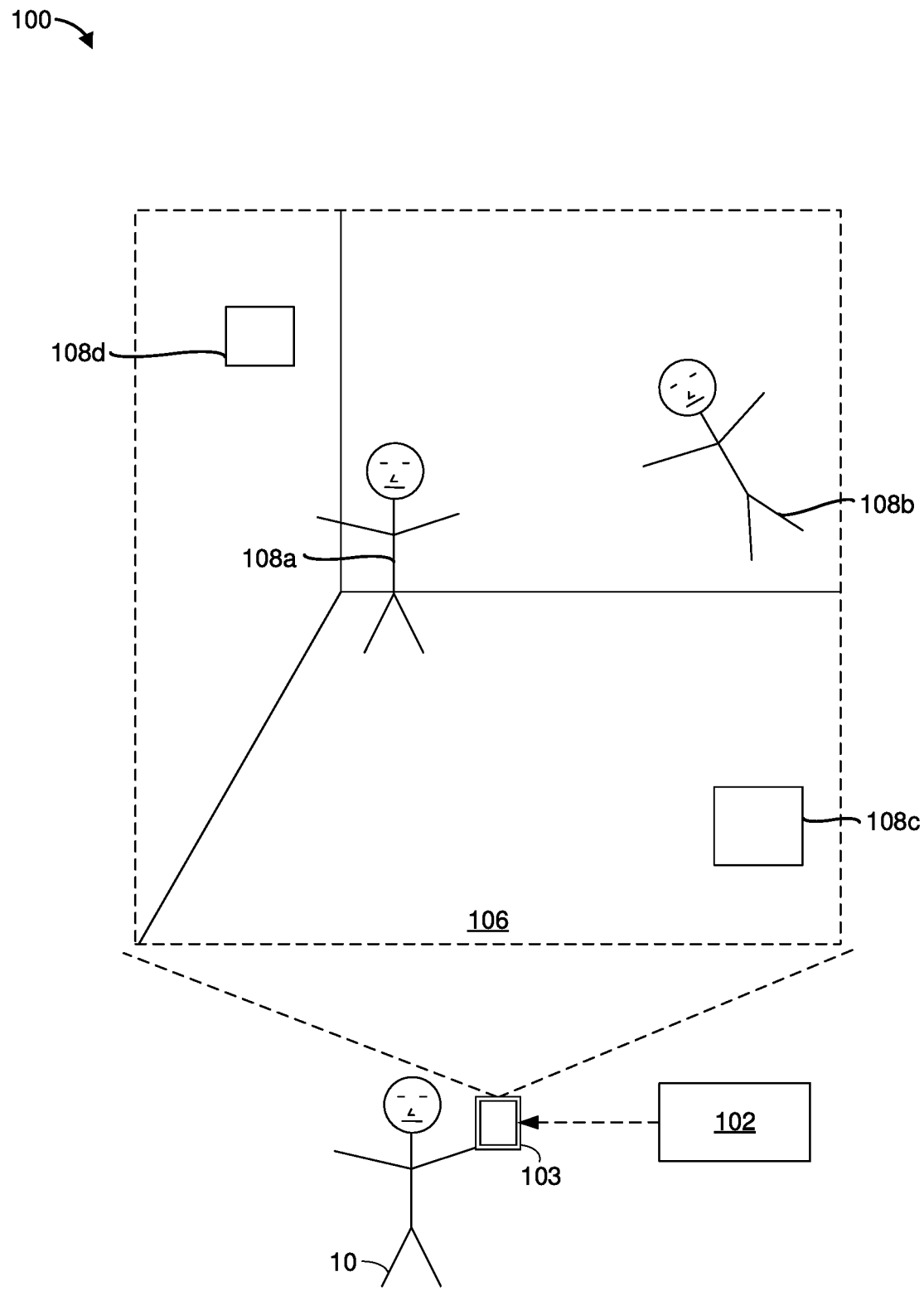
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating directives for objective-effectuators. In various implementations, a device includes a non-transitory memory and one or more processors coupled with the non-transitory memory. In some implementations, a method includes generating, in coordination with an emergent content engine, a first objective for a first objective-effectuator and a second objective for a second objective-effectuator instantiated in a computer-generated reality (CGR) environment. In some implementations, the first and second objectives are associated with a mutual plan. In some implementations, the method includes generating, based on characteristic values associated with the first and second objective-effectuators a first directive for the first objective-effectuator and a second directive for the second objective-effectuator. In some implementations, the first directive limits actions generated by the first objective-effectuator over a first set of one or more time frames associated with the first objective and the second directive limits actions generated by the second objective-effectuator over a second set of one or more time frames associated with the second objective. In some implementations, the method includes displaying manipulations of CGR representations of the first and second objective-effectuators in the CGR environment in accordance with the first and second directives.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for generating directives for objective-effectuators instantiated in a CGR environment. A director generates the directives for the objective-effectuators in order to advance the objective-effectuators towards corresponding objectives. The directives provide guidance to objective-effectuators in order to advance the objective-effectuators towards the corresponding objectives. The directives limit actions that the objective-effectuators generate in order to satisfy the corresponding objectives. CGR representations of the objective-effectuators generate and perform actions in accordance with the directives in order to advance the corresponding objectives.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated reality (CGR) environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from the physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of objective-effectuators, such as a boy action figure representation 108a representing a boy objective-effectuator, a girl action figure representation 108b representing a girl objective-effectuator, a robot representation 108c representing a robot objective-effectuator, and a drone representation 108d representing a drone objective-effectuator. In some implementations, the objective-effectuators represent (e.g., model behavior of) characters from fictional materials, such as movies, video games, comics, and novels. For example, the boy action figure representation 108a represents a 'boy action figure' character from a fictional comic, and the girl action figure representation 108b represents a 'girl action figure' character from a fictional video game. In some implementations, the CGR environment 106 includes CGR representations of objective-effectuators that represent (e.g., model behavior of) characters from different fictional materials (e.g., from different movies/games/comics/novels). In various implementations, the objective-effectuators model behavior of physical entities (e.g., tangible objects). For example, in some implementations, the objective-effectuators model behavior of equipment (e.g., machinery such as planes, tanks, robots, cars, etc.). In the example of FIG. 1, the robot representation 108c represents a robot objective-effectuator that models the behavior of a robot and the drone representation 108d represents a drone objective-effectuator that models the behavior of a drone. In some implementations, the objective-effectuators model the behavior of entities (e.g., characters or equipment) from fictional materials. In some implementations, the objective-effectuators model the behavior of entities from a physical environment, including things located inside and/or outside of the CGR environment 106. In various implementations, an objective-effectuator models the behavior of an entity by manipulating a CGR representation of the objective-effectuator in order to provide an appearance that the CGR representation of the objective-effectuator is performing a set of one or more actions that are within a similarity threshold of actions that the entity performs.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators perform. In some implementations, the actions of the objective-effectuators are within a degree of similarity to (e.g., within a similarity threshold of) actions that the corresponding entities (e.g., characters or objects) perform in the fictional material. In the example of FIG. 1, the girl action figure representation 108b is performing the action of flying (e.g., because the corresponding 'girl action figure' character is capable of flying, and/or the 'girl action figure' character frequently flies in the fictional materials). In the example of FIG. 1, the drone representation 108d is performing the action of hovering (e.g., because drones in physical environments are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, a CGR representation of an objective-effectuator performs an action in order to satisfy (e.g., complete or achieve) an objective of the objective-effectuator. In some implementations, an objective-effectuator is associated with a particular objective, and the CGR representation of the objective-effectuator performs actions that improve the likelihood of satisfying that particular objective. In some implementations, CGR representations of the objective-effectuators are referred to as CGR objects. In some implementations, an objective-effectuator representing (e.g., modeling the behavior of) a character is referred to as a character objective-effectuator. In some implementations, a character objective-effectuator performs actions to effectuate a character objective. In some implementations, an objective-effectuator representing (e.g., modeling the behavior of) an equipment is referred to as an equipment objective-effectuator. In some implementations, an equipment objective-effectuator performs actions to effectuate an equipment objective. In some implementations, an objective-effectuator representing (e.g., modeling the behavior of) an environment is referred to as an environmental objective-effectuator. In some implementations, an environmental objective-effectuator performs environmental actions to effectuate an environmental objective.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 generate corresponding objectives for the objective-effectuators. For example, the controller 102 and/or the electronic device 103 generate a first objective for the boy action figure representation 108a, a second objective for the girl action figure representation 108b, a third objective for the robot representation 108a, and a fourth objective for the drone representation 108d. In some implementations, each objective is associated with a set of one or more time frames that defines a duration (e.g., a lifespan) of the objective. In some implementations, a time frame refers to a unit of time (e.g., a millisecond, a second, a minute, an hour, a day, a week, a month, or a year). In some implementations, different objectives have different lifespans. As an example, the controller 102 and/or the electronic device 103 assign the first objective for the boy action figure representation 108a a lifespan of 8 minutes, and the controller 102 and/or the electronic device 103 assign the second objective for the girl action figure representation 108b a lifespan of 2 hours.

In various implementations, the objectives for the objective-effectuators are associated with a mutual plan. In some implementations, the mutual plan characterizes a type of content that is generated in the CGR environment 106. For example, in some implementations, the mutual plan is to generate content that satisfies a comedy threshold, a suspense threshold, a rescue threshold, a tragedy threshold, etc. In some implementations, the mutual plan includes a content template (e.g., a plot template) for generating a corresponding content type. For example, the mutual plan includes a comedy template for generating comedic content, a suspense template for generating suspenseful content, a tragedy template for generating tragic content, etc.

In various implementations, the controller 102 and/or the electronic device 103 generate directives for the objective-effectuators in order to advance the objective-effectuators towards the objectives of the objective-effectuators. For example, the controller 102 and/or the electronic device 103 generate a first directive for the body action figure representation 108a in order to advance the boy action figure representation 108a towards the first objective. In some implementations, a directive guides the objective-effectuator towards the objective by providing guidance to the objective-effectuator. For example, in some implementations, a directive guides an objective-effectuator by limiting actions that the objective-effectuator generates. In some implementations, a directive includes specific guidance on satisfying a corresponding objective. For example, in some implementations, a directive includes a location/time for satisfying the objective. In some implementations, a directive includes a behavioral attribute value that indicates a target behavior for a CGR representation of an objective-effectuator while advancing towards the objective.

In various implementations, the CGR representation of the objective-effectuators performs actions in accordance with the directives generated by the controller 102 and/or the electronic device 103. For example, the boy action figure representation 108a performs actions in accordance with the first directive that the controller 102 and/or the electronic device 103 generated for the boy action figure representation 108a. In some implementations, the controller 102 and/or the electronic device 103 manipulate the CGR representations of the objective-effectuators to display performance of actions in accordance with the directives.

In some implementations, the user 10 wears a head-mountable device (HMD). In various implementations, the HMD operates in substantially the same manner as the electronic device 103 shown in FIG. 1. In some implementations, the HMD performs substantially the same operations as the electronic device 103 shown in FIG. 1. For example, in some implementations, the HMD, being worn by the user 10, presents (e.g., displays) the CGR environment 106 according to various implementations. In some implementations, the HMD includes an integrated display (e.g., a built-in display) that displays the CGR environment 106. In some implementations, the HMD includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the CGR environment 106.

Figure 2A:
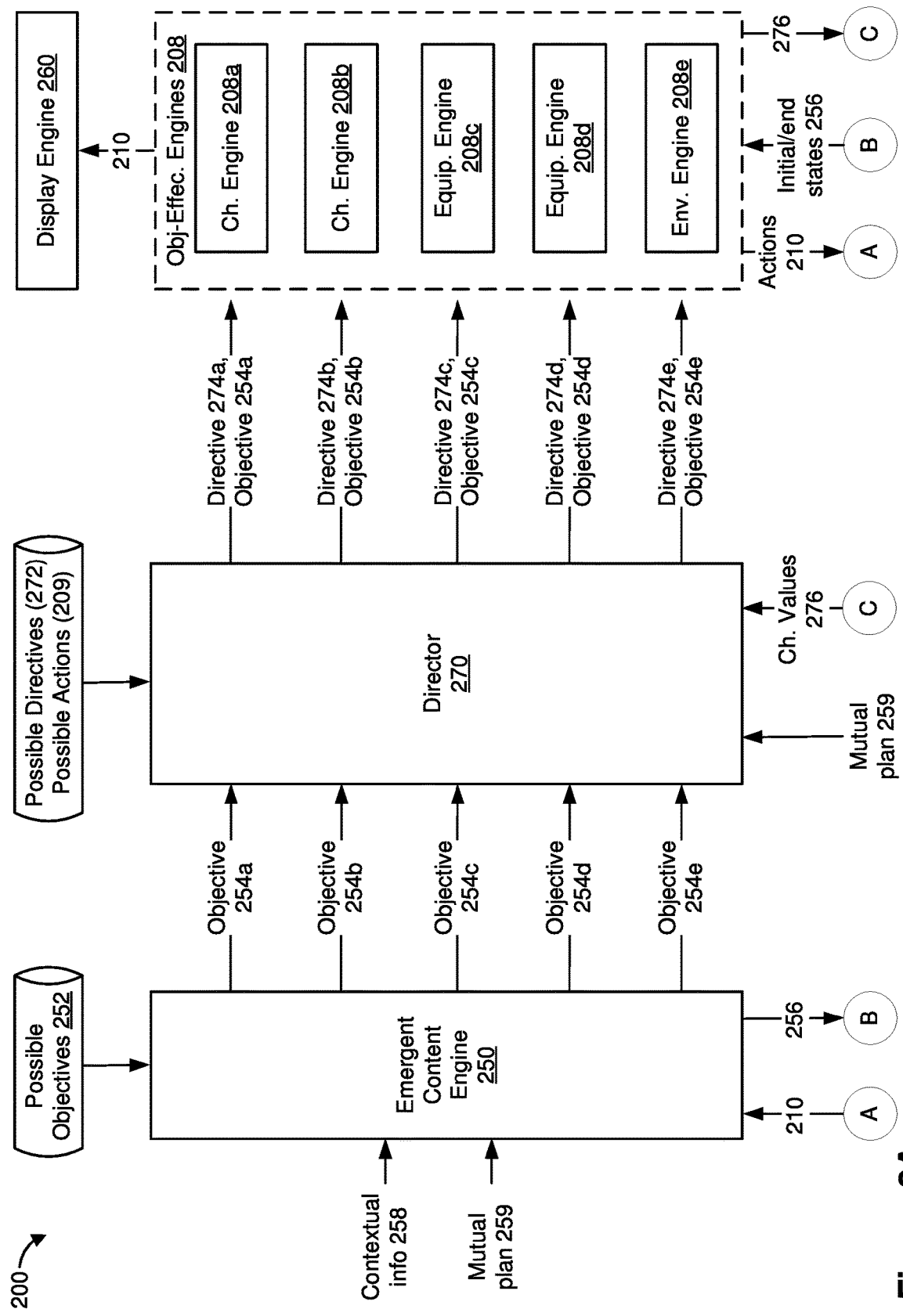
FIG. 2A is a block diagram of an example system in accordance with some implementations.

FIG. 2A is a block diagram of an example system 200 that generates directives for various objective-effectuators in a CGR environment. To that end, the system 200 includes objective-effectuator engines 208, an emergent content engine 250, and a director 270. In various implementations, the emergent content engine 250 generates objectives 254a . . . 254e for various objective-effectuators. The director 270 generates directives 274a . . . 274e for the corresponding objectives 254a . . . 254e. The objective-effectuator engines 208 generate actions 210 in accordance with the directives 274a . . . 274e in order to advance the objectives 254a . . . 254e. CGR representations of the objective-effectuators perform the actions 210.

In various implementations, the emergent content engine 250 generates the objectives 254a . . . 254e for the objective-effectuator engines 208. In some implementations, the emergent content engine 250 generates a first objective 254a for a boy objective-effectuator represented by the boy action figure representation 108a shown in FIG. 1. The emergent content engine 250 generates a second objective 254b for a girl objective-effectuator represented by the girl action figure representation 108b shown in FIG. 1. The emergent content engine 250 generates a third objective 254c for a robot objective-effectuator represented by the robot representation 108c shown in FIG. 1. The emergent content engine 250 generates a fourth objective 254d for a drone objective-effectuator represented by the drone representation 108d shown in FIG. 1. The emergent content engine 250 generates a fifth objective 254e for an environmental objective-effectuator that models the behavior of an environment of the CGR environment 106 shown in FIG. 1.

In various implementations, the emergent content engine 250 generates the objectives 254a . . . 254e based on contextual information 258. In some implementations, the contextual information 258 includes information regarding a CGR environment (e.g., the CGR environment 106 shown in FIG. 1). For example, in some implementations, the contextual information 258 indicates the objective-effectuators that are instantiated in the CGR environment 106.

In some implementations, the emergent content engine 250 generates the objectives 254a . . . 254e based on a mutual plan 259. In some implementations, the objectives 254a . . . 254e are associated with the mutual plan 259. For example, the objectives 254a . . . 254e form different pieces of the mutual plan 259. In some implementations, the mutual plan 259 includes a content type, and the objectives 254a . . . 254e collectively trigger content generation that is of the content type. For example, if the mutual plan 259 is to generate comedic content, then the objectives 254a . . . 254e collectively trigger generation of actions 210 that are comedic. In some implementations, the mutual plan 259 includes a plot template, and the objectives 254a . . . 254e trigger content generation that satisfies the plot template. Example plot templates include a comedy template, a rescue template, a disaster template, a tragedy template and a suspense template.

In some implementations, the emergent content engine 250 provides initial/end states 256 to the objective-effectuator engines 208. In some implementations, the initial/end states 256 indicate placements (e.g., locations) of various character/equipment representations within a CGR environment. In some implementations, a CGR environment is associated with a time duration (e.g., a few seconds, minutes, hours, or days). For example, the CGR environment is scheduled to last for the time duration. In such implementations, the initial/end states 256 indicate placements of various character/equipment representations at/towards the beginning and/or at/towards the end of the time duration. In some implementations, the initial/end states 256 indicate environmental conditions for the CGR environment at/towards the beginning/end of the time duration associated with the CGR environment.

In some implementations, the emergent content engine 250 generates the objectives 254a . . . 254e based on a set of possible objectives 252 that are stored in a datastore. In some implementations, the set of possible objectives 252 is obtained from corresponding fictional source material. For example, in some implementations, the set of possible objectives 252 for the girl action figure representation 108b includes saving lives, rescuing pets, and/or fighting crime.

In various implementations, the director 270 generates directives 274a . . . 274e for the corresponding objectives 254a . . . 254e. In some implementations, the director 270 generates a first directive 274a for the boy objective-effectuator represented by the boy action figure representation 108a shown in FIG. 1. The director 270 generates a second directive 274b for the girl objective-effectuator represented by the girl action figure representation 108b shown in FIG. 1. The director 270 generates a third directive 274c for the robot objective-effectuator represented by the robot representation 108c shown in FIG. 1. The director 270 generates a fourth directive 274d for the drone objective-effectuator represented by the drone representation 108d shown in FIG. 1. The director 270 generates a fifth directive 274e for the environmental objective-effectuator.

In some implementations, the directives 274a . . . 274e provide guidance on how to satisfy the corresponding objectives 254a . . . 254e. In some implementations, the directives 274a . . . 274e provide guidance by limiting the actions 210 that the objective-effectuators 208 can generate in order to satisfy the objectives 254a . . . 254e. In some implementations, the directives 274a . . . 274e indicate when to perform the actions 210 to satisfy the objectives 254a . . . 254e. For example, the first directive 274a provides a time for satisfying the first objective 254a. In some implementations, the directives 274a . . . 274e indicate where to perform the actions 210 to satisfy the objectives 254a . . . 254e. For example, the second directive 274b specifies a location within the CGR environment 106 to perform actions that satisfy the second objective 254b. In some implementations, the directives 274a . . . 274e provide behavioral attribute values for the CGR representations of the objective-effectuators while advancing towards the objectives 254a . . . 254e. For example, the second directive 274b instructs the girl action figure representation 108b to display a specified degree of anger while advancing towards the second objective 254b.

In some implementations, the director 270 generates the directives 274a . . . 274e based on characteristic values 276 associated with the objective-effectuators. In some implementations, the characteristic values 276 indicate structural qualities of the CGR representations of the objective-effectuators. In such implementations, the director 270 selects directives which trigger actions that the CGR representations are capable of performing based on their structural qualities, and the director 270 forgoes directives which trigger actions that are not possible due to the structural qualities. In some implementations, the characteristic values 276 indicate functionality of the CGR representations of the objective-effectuators (e.g., whether a CGR representation of an objective-effectuator can fly). In some implementations, the characteristic values 276 indicate behavioral attributes of the objective-effectuators (e.g., a degree of aggressiveness of an objective-effectuator). In some implementations, the characteristic values 276 indicate a mood of a CGR representation of an objective-effectuator (e.g., whether the boy action figure representation 108a is in a happy mood or a sad mood). In some implementations, the director 270 obtains the characteristic values 276 from the objective-effectuator engines 208.

In some implementations, the director 270 generates the directives 274a . . . 274e based on a set of possible directives 272 that are stored in a datastore. In some implementations, the director 270 obtains the set of possible directives 272 from corresponding fictional source material. For example, in some implementations, the director 270 performs semantic analysis on fictional source material to determine that the set of possible directives 272 for the girl action figure representation 108b includes flying to get to places and wearing a black mask while rescuing someone or fighting crime.

In some implementations, the director 270 generates the directives 274a . . . 274e based on a set of possible actions 209 stored in a datastore. In some implementations, the set of possible actions 209 represent actions that the CGR representations of objective-effectuators are capable of performing in a CGR environment. For example, the set of possible actions 209 represent actions that the boy action figure representation 108a, the girl action figure representation 108b, the robot representation 108c and/or the drone representation 108d are capable of performing. In some implementations, the director 270 generates the directives 274a . . . 274e such that the directives 274a . . . 274e can be satisfied (e.g., carried out) with the set of possible actions 209.

In some implementations, the director 270 generates the directives 274a . . . 274e based on the mutual plan 259. In some implementations, the directives 274a . . . 274e trigger actions that satisfy the mutual plan 259. For example, if the mutual plan 259 is to generate comedic content, then the directives 274a . . . 274e trigger actions that are comedic. In some implementations, the directives 274a . . . 274e individually form different pieces of the mutual plan 259. For example, if the mutual plan 259 is to create suspense, then the first directive 274a may trigger actions that create the suspense, and the second directive 274b may trigger actions that maintain the suspense. In some implementations, the mutual plan 259 includes a content template (e.g., a plot template, for example, a comedy template, a rescue template, a disaster template, a tragedy template and a suspense template). In such implementations, the directives 274a . . . 274e satisfy the content template.

In the example of FIG. 2A, the objective-effectuator engines 208 include a boy character engine 208a, a girl character engine 208b, a robot equipment engine 208c, a drone equipment engine 208d, and an environmental objective-effectuator engine 208e. The boy character engine 208a generates actions for the boy action figure representation 108a shown in FIG. 1. The girl character engine 208b generates actions for the girl action figure representation 108b. The robot equipment engine 208c generates actions for the robot representation 108c. The drone equipment engine 208d generates actions for the drone representation 108d. The environmental objective-effectuator engine 208e generates actions or environmental responses for the environment of the CGR environment 106.

In various implementations, the director 270 provides the objectives 254a . . . 254e and the directives 274a . . . 274e to the objective-effectuator engines 208. For example, the director 270 provides the first objective 254a and the first directive 274a to the boy character engine 208a. The objective-effectuator engines 208 utilize the directives 274a . . . 274e to generate actions that advance the objectives 254a . . . 254e. For example, the girl character engine 208b utilizes the second directive 274b to generate actions for the girl action figure representation 108b in order to satisfy the second objective 254b. In some implementations, the objective-effectuator engines 208 provide the actions 210 to the emergent content engine 250, and the emergent content engine 250 generates future objectives and/or modifies current objectives based on the actions 210. In some implementations, the objective-effectuator engines 208 provide the actions 210 to the director 270, and the director 270 generates future directives and/or modified current directives based on the actions 210. In some implementations, the objective-effectuator engines 208 utilize the initial/end states 256 to generate the actions 210.

In some implementations, the objective-effectuator engines 208 set the characteristic values 276 for the objective-effectuators, and provide the characteristic values 276 to the director 270. In some implementations, the objective-effectuator engines 208 adjust the characteristic values 276 based on the actions 210. For example, the objective-effectuator engines 208 modify the characteristic values 276 in order to provide the CGR representations of the objective-effectuators with capabilities that allow performance of the actions 210.

In various implementations, the objective-effectuator engines 208 provide the actions 210 to a display engine 260 (e.g., a rendering and display pipeline). In some implementations, the display engine 260 modifies the CGR representations of the objective-effectuators and/or the environment of the CGR environment 106 based on the actions 210. In various implementations, the display engine 260 modifies the CGR representations of the objective-effectuators such that the CGR representations of the objective-effectuator can be seen as performing the actions 210. For example, if an action for the girl action figure representation 108b is to fly, the display engine 260 moves the girl action figure representation 108b within the CGR environment 106 in order to give the appearance that the girl action figure representation 108b is flying within the CGR environment 106.

Figure 2B:
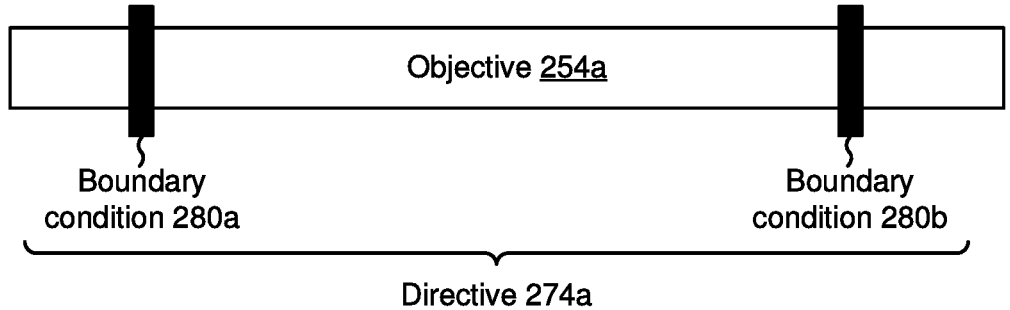
FIG. 2B is a diagram of an example directive in accordance with some implementations.

FIG. 2B is an example diagram of the first directive 274a in accordance with some implementations. In the example of FIG. 2B, the first directive 274a defines boundary conditions 280a and 280b for the first objective 254a. In some implementations, the boundary conditions 280a and 280b represent limits on the first objective 254a. In some implementations, the boundary conditions 280a and 280b represent temporal limits on the first objective 254a. For example, the boundary condition 280a represents a first time at which the first objective 254a is activated and the boundary condition 280b represents a second time at which the first objective 254a is deactivated. In some implementations, the boundary conditions 280a and 280b represent limits on actions that the boy action figure representation 108a can perform to advance towards the first objective 254a. For example, the boundary condition 280a represents a lower force threshold that the boy action figure representation 108a can apply when throwing a punch and the boundary condition 280b represents an upper force threshold that the boy action figure representation 108b can apply when throwing a punch.

Figure 2C:
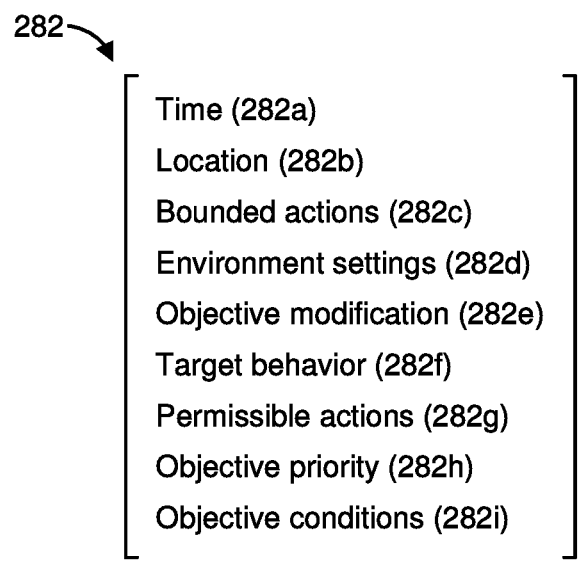
FIG. 2C is a diagram of an example objective characterization vector in accordance with some implementations.

FIG. 2C is a diagram of an example objective characterization vector 282 in accordance with some implementations. In some implementations, the objective characterization vector 282 characterizes an objective (e.g., one of the objectives 254a . . . 254e shown in FIG. 2A). In some implementations, a directive (e.g., one of the directives 274a . . . 274e shown in FIG. 2A) includes the objective characterization vector 282. In some implementations, the objective characterization vector 282 further characterizes an objective. In some implementations, the objective characterization vector 282 includes guidance (e.g., specific guidance or vague guidance) on advancing towards the objective.

In the example of FIG. 2C, the objective characterization vector 282 includes a time 282a for satisfying the objective. In some implementations, the time 282a includes a time period for satisfying the objective. In some implementations, the time 282a includes a start time at which the objective is activated and a stop time at which the objective is deactivated.

In some implementations, the objective characterization vector 282 includes a location 282b for satisfying the objective. In some implementations, the location 282b defines a geographical area within the CGR environment for performing actions that advance the objective.

In some implementations, the objective characterization vector 282 includes bounded actions 282c. In some implementations, the bounded actions 282c limit actions that the CGR representation of the objective-effectuator performs in order to advance towards the objective. In some implementations, the bounded actions 282c indicate a set of permissible actions for the CGR representation of the objective-effectuator. In such implementations, the objective-effectuator engine generates actions by selecting the actions from the set of permissible actions. In some implementations, the bounded actions 282c indicate a set of impermissible actions for the CGR representation of the objective-effectuator. In such implementations, the objective-effectuator engine forgoes actions that are included in the set of impermissible actions.

In some implementations, the objective characterization vector 282 includes environmental settings 282d for the CGR environment 106. In some implementations, the environmental settings 282d trigger actions that advance an objective-effectuator towards the objective. More generally, in various implementations, a directive includes passive guidance that triggers an objective-effectuator to generate actions from a subset of possible actions by eliminating the remainder of the possible actions (e.g., by setting environmental settings 282d that make the remainder of the possible actions impossible or infeasible).

In some implementations, the objective characterization vector 282 includes an objective modification 282e. In some implementations, the objective breaches the mutual plan 259, and the objective modification 282e modifies the objective in order to satisfy the mutual plan 259. In some implementations, the objective modification 282e blocks the objective (e.g., deactivates the objective, puts the objective on hold, or deletes the objective). In some implementations, the objective modification 282e demotes the objectives (e.g., by reducing a priority of the objective). In some implementations, the objective modification 282e dampens the objective (e.g., relaxes the objective, for example, by designating the objective as optional). In some implementations, the objective modification 282e modifies the objective in order to intertwine the objective with other objectives (e.g., in order to create conflicts between the objective-effectuators).

In some implementations, the objective characterization vector 282 indicates a target behavior 282f (e.g., a behavioral attribute value) for the CGR representation of the objective-effectuator. In some implementations, the CGR representation of the objective-effectuator adopts the target behavior 282f while advancing towards the objective. Examples of the target behavior 282f include a degree of aggressiveness, a level of happiness, angry, sad, frustrated, calm, etc.

In some implementations, the objective characterization vector 282 indicates a set of permissible actions 282g for advancing the objective. In some implementations, the set of permissible actions 282g limits a set of possible actions that the objective-effectuator engine accesses to generate the actions for the CGR representation of the objective-effectuator. In some implementations, the objective characterization vector 282 indicates a set of impermissible actions that the CGR representation of the objective-effectuator is prevented from performing.

In some implementations, the objective characterization vector 282 indicates an objective priority 282h. In some implementations, the objective priority 282h refers to a priority/preference for the objective. For example, the objective priority 282h indicates whether the objective has a high priority, a medium priority, or a low priority. In some implementations, the objective includes a set of micro-objectives, and the objective priority 282h indicates a priority for each of the set of micro-objectives. In some implementations, the objective priority 282h ranks the objective relative to other objectives.

In some implementations, the objective characterization vector 282 includes conditions 282i for the objective. In some implementations, the conditions 282i indicate environmental conditions for the CGR environment 106. In some implementations, the conditions 282i trigger activation and/or deactivation of the objective. For example, in some implementations, the conditions 282i make the objective conditional upon the completion of another objective. In some implementations, the conditions 282i make the objective conditional upon the failure of another objective.

Figure 3A:
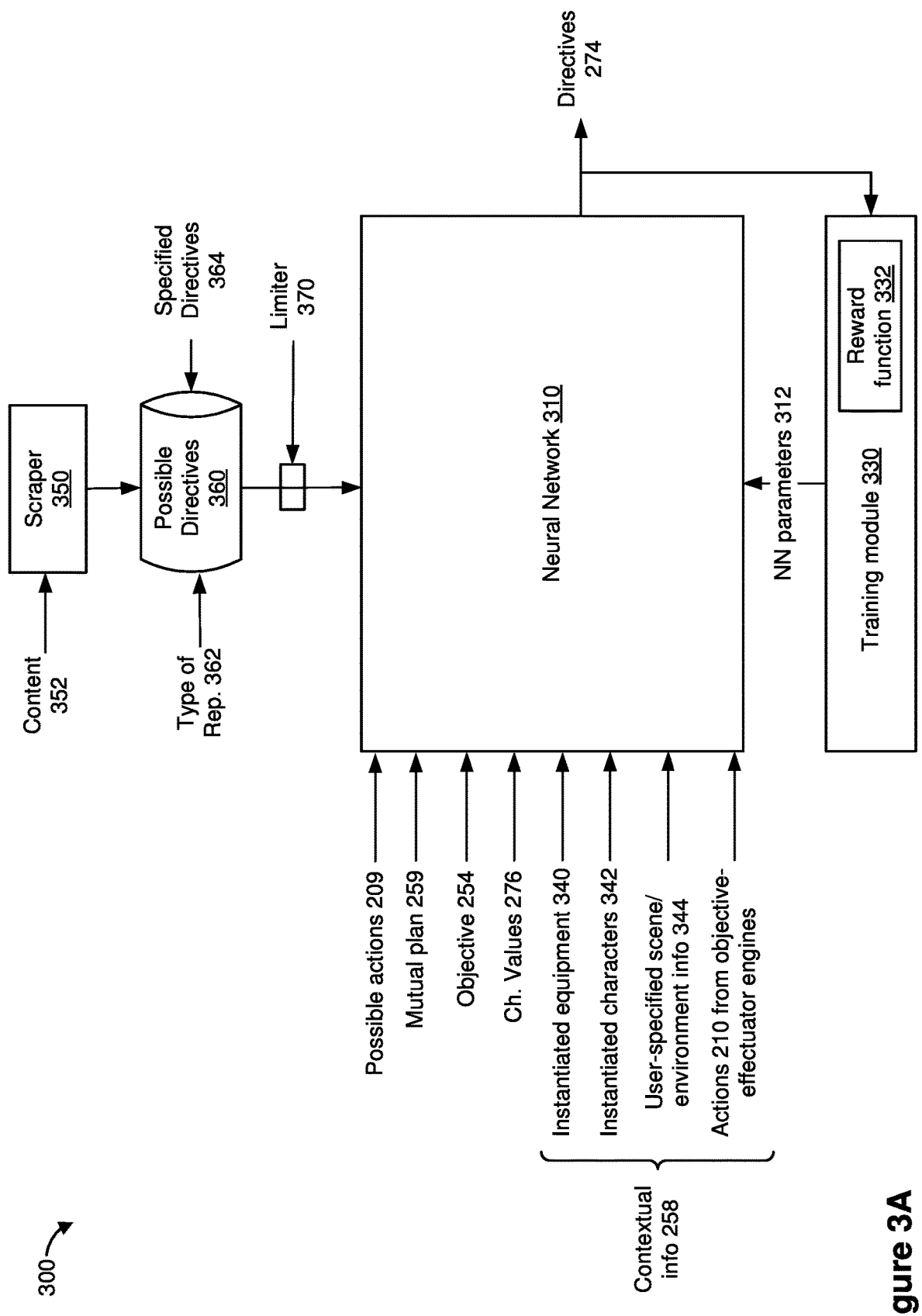
FIG. 3A is a block diagram of an example director in accordance with some implementations.

FIG. 3A is a block diagram of an example director 300 in accordance with some implementations. In some implementations, the director 300 implements the director 270 shown in FIG. 2A. In some implementations, the director 300 generates directives 274 for various objective-effectuators. In some implementations, the directives 274 trigger the objective-effectuator engines (e.g., the boy character engine 208a, the girl character engine 208b, the robot equipment engine 208c, the drone equipment engine 208d, and the environmental objective-effectuator engine 208e) to generate actions in accordance with the directives 274.

In various implementations, the director 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible directives 360 to the neural network 310. In various implementations, the neural network 310 generates the directives 274 for objective-effectuator engines based on various inputs including the set of possible actions 209, the objectives 254, the contextual information 258, the mutual plan 259 and/or the characteristic values 276.

In some implementations, the neural network 310 includes a long short-term memory (LSTM) recurrent neural network (RNN). In various implementations, the neural network 310 generates the directives 274 based on a function of the possible directives 360. For example, in some implementations, the neural network 310 generates the directives 274 by selecting a subset of the possible directives 360. In some implementations, the neural network 310 generates the directives 274 such that the directives 274 are within a degree of similarity (e.g., within a similarity threshold) of at least some of the possible directives 360.

In some implementations, the neural network 310 generates the directives 274 based on instantiated equipment representations 340. In some implementations, the instantiated equipment representations 340 refers to equipment objective-effectuators that are instantiated in the CGR environment. For example, referring to FIG. 1, the instantiated equipment representations 340 include the robot representation 108c and the drone representation 108d in the CGR environment 106.

In some implementations, the neural network 310 generates the directives 274 based on instantiated character representations 342. In some implementations, the instantiated character representations 342 refers to character objective-effectuators that are instantiated in the CGR environment. For example, referring to FIG. 1, the instantiated character representations 342 include the boy action figure representation 108a and the girl action figure representation 108b in the CGR environment 106.

In some implementations, the neural network 310 generates the directives 274 based on user-specified scene/environment information 344. In some implementations, the user-specified scene/environment information 344 includes the initial/end states 256 shown in FIG. 2A. In some implementations, the directives 274 are a function of the initial/end states 256. In some implementations, the neural network 310 adjusts the directives 274 so that the directives 274 are better suited for the user-specified scene/environment information 344.

In some implementations, the neural network 310 generates the directives 274 based on actions 210 (e.g., previous actions) generated by the objective-effectuator engines. In some implementations, the neural network 310 modifies the directive for a particular objective-effectuator based on previous actions performed by CGR representations of other objective-effectuators.

In various implementations, the neural network 310 generates the directives 274 based on objectives 254 from the emergent content engine 250. In some implementations, the neural network 310 generates the directives 274 in order to satisfy the objectives 254 from the emergent content engine 250. In some implementations, the neural network 310 evaluates the possible directives 360 with respect to the objectives 254. In such implementations, the neural network 310 generates the directives 274 by selecting a subset of the possible directives 360 that satisfy the objectives 254 and forgoing selection of the possible directives 360 that do not satisfy the objectives 254.

As described herein, in various implementations, the directives 274 provide guidance on how to satisfy the objectives 254. In some implementations, the directives 274 provide guidance on how to satisfy the objectives 254 by specifying a time and/or a location for performing actions that satisfy the objectives 254. In some implementations, the directives 274 narrow a scope of the objectives 254 by providing boundary conditions for the objectives 254. For example, in some implementations, the directives 274 provide guidance by limiting a set of actions that CGR representations can perform in order to satisfy the objectives 254.

In various implementations, the neural network 310 generates the directives 274 based on one or more characteristic values 276 associated with the objective-effectuators. In some implementations, the one or more characteristic values 276 indicate one or more physical characteristics (e.g., structural characteristics) of the CGR representations of the objective-effectuators. For example, the one or more characteristic values 276 indicate a body material of a CGR representation of an objective-effectuator. In such implementations, the directives 274 utilizes the physical characteristics that the CGR representation possesses, and do not utilize the physical characteristics that the CGR representation does not possess. For example, if the CGR representation is made from wax, then the directives 274 specify avoiding hot areas where there is a risk of melting.

In some implementations, the one or more characteristic values 276 indicate accessories that the CGR representations of the objective-effectuators have (e.g., a jet pack for flying). In such implementations, the directives 274 utilize the accessories that the CGR representations have, and avoid accessories that the CGR representations do not have. For example, if a CGR representation has the jet pack accessory, then the directive 274 for that CGR representation may include flying. However, if the CGR representation does not have the jet pack accessory, then the directive 274 for that CGR representation may not include flying or the directive 274 may include taking a CGR airplane to fly.

In some implementations, the one or more characteristic values 276 indicate one or more behavioral characteristics of the CGR representations of the objective-effectuators. In some implementations, the behavioral characteristics include long-term personality traits such as a level of aggressiveness, a level of patience, a level of politeness, etc. In some implementations, the behavioral characteristics include short-term behavioral attributes such as a mood of the CGR representation of the objective-effectuator. In some implementations, the directives 274 include actions which rely on behavioral traits that the CGR representation possesses. For example, if the CGR representation has a relatively high level of aggressiveness, then the directive 274 for that CGR representation may include initiating a fight.

In some implementations, the neural network 310 generates the directives 274 based on the mutual plan 259. In some implementations, the directives 274 trigger actions which satisfy the mutual plan 259. For example, if the mutual plan 259 is to generate comedic content, then the directives 274 trigger comedic actions.

In some implementations, the neural network 310 generates the directives 274 based on the set of possible actions 209. In some implementations, the neural network 310 generates the directives 274 such that the directives 274 can be satisfied (e.g., carried out) with the set of possible actions 209.

In various implementations, the training module 330 trains the neural network 310. In some implementations, the training module 330 provides neural network (NN) parameters 312 to the neural network 310. In some implementations, the neural network 310 includes a model of neurons, and the neural network parameters 312 represent weights for the neurons. In some implementations, the training module 330 generates (e.g., initializes/initiates) the neural network parameters 312, and refines the neural network parameters 312 based on the directives 274 generated by the neural network 310.

In some implementations, the training module 330 includes a reward function 332 that utilizes reinforcement learning to train the neural network 310. In some implementations, the reward function 332 assigns a positive reward to directives that are desirable, and a negative reward to directives that are undesirable. In some implementations, during a training phase, the training module 330 compares the directives with verification data that includes verified directives. In such implementations, if a particular directive is within a degree of similarity to (e.g., within a similarity threshold of) the verified directives, then the training module 330 stops training the neural network 310. However, if the directive is not within the degree of similarity to the verified directive, then the training module 330 continues to train the neural network 310. In various implementations, the training module 330 updates the neural network parameters 312 during/after the training.

In various implementations, the scraper 350 scrapes content 352 to identify the possible directives 360. In some implementations, the content 352 includes movies, video games, comics, novels, and fan-created content such as blogs and commentary. In some implementations, the scraper 350 utilizes various methods, systems, and devices associated with content scraping to scrape the content 352. For example, in some implementations, the scraper 350 utilizes one or more of text pattern matching, HTML (Hyper Text Markup Language) parsing, DOM (Document Object Model) parsing, image processing, and audio analysis in order to scrape the content 352 and identify the possible directives 360. In some implementations, the scraper 350 extracts actions from the content 352 and performs semantic analysis on the extracted actions to generate the possible directives 360.

In some implementations, an objective-effectuator is associated with a type of representation 362, and the neural network 310 generates the directives 274 based on the type of representation 362 associated with the objective-effectuator. In some implementations, the type of representation 362 indicates the characteristic values 276 of the objective-effectuator (e.g., structural characteristics, functional characteristics and/or behavioral characteristics). In some implementations, the type of representation 362 is determined based on a user input. In some implementations, the type of representation 362 is determined based on a combination of rules.

In some implementations, the neural network 310 generates the directives 274 based on specified directives 364. In some implementations, the specified directives 364 are provided by an entity that controls the fictional materials from where the character/equipment originated. For example, in some implementations, the specified directives 364 are provided (e.g., conceived of) by a movie producer, a video game creator, a novelist, etc. In some implementations, the possible directives 360 include the specified directives 364. As such, in some implementations, the neural network 310 generates the directives 274 by selecting a portion of the specified directives 364.

In some implementations, the possible directives 360 for an objective-effectuator are limited by a limiter 370. In some implementations, the limiter 370 restricts the neural network 310 from selecting a portion of the possible directives 360. In some implementations, the limiter 370 is controlled by the entity that controls (e.g., owns) the fictional materials from where the character/equipment originated. For example, in some implementations, the limiter 370 is controlled (e.g., operated and/or managed) by a movie producer, a video game creator, a novelist, etc. In some implementations, the limiter 370 and the neural network 310 are controlled/operated by different entities. In some implementations, the limiter 370 restricts the neural network 310 from generating directives that breach a criterion defined by the entity that controls the fictional materials.

Figure 3B:
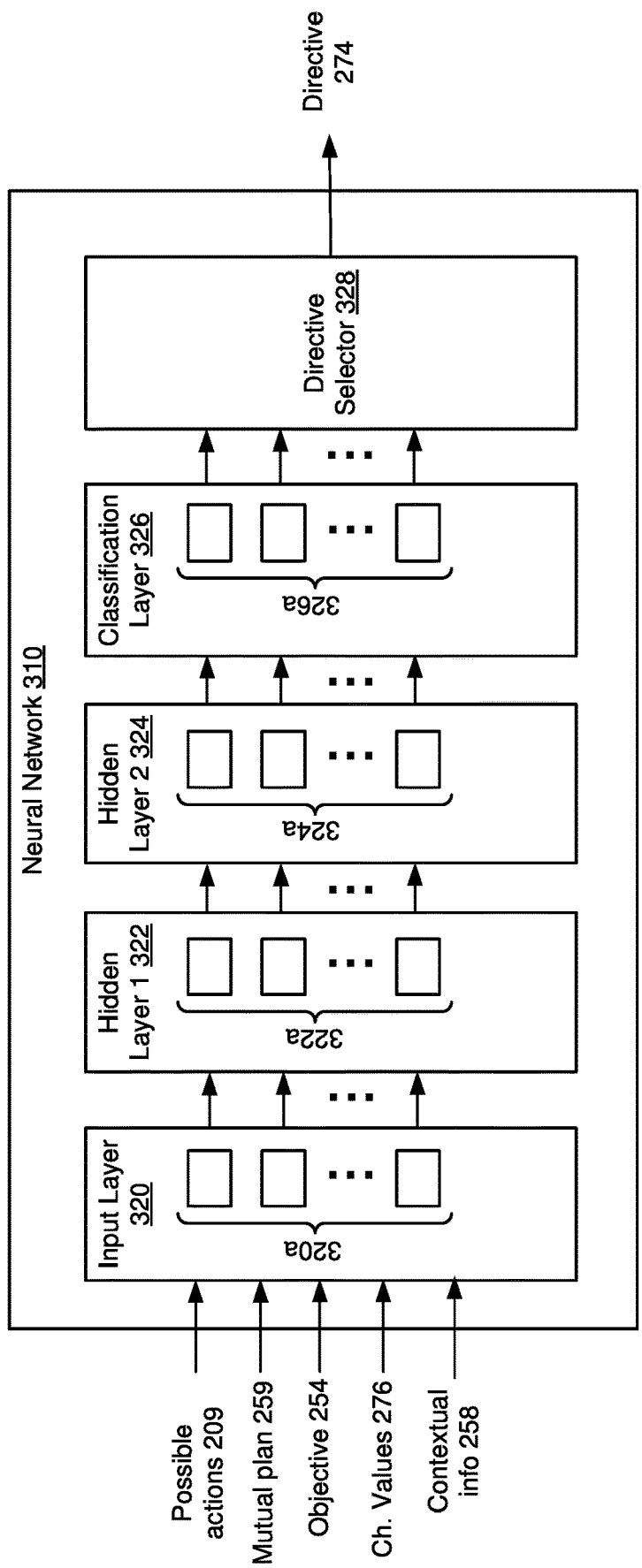
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and a directive selector 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled (e.g., configured) to receive various inputs. In the example of FIG. 3B, the input layer 320 receives as inputs the set of possible actions 209, the objectives 254, the contextual information 258, the mutual plan 259, and the characteristic values 276. In some implementations, the neural network 310 includes a feature extraction module (not shown) that generates a feature stream (e.g., a feature vector) based on the set of possible actions 209, the objectives 254, the contextual information 258, the mutual plan 259 and the characteristic values 276. In such implementations, the feature extraction module provides the feature stream to the input layer 320. As such, in some implementations, the input layer 320 receives a feature stream that is a function of the objectives 254, the contextual information 258, the mutual plan 259, and the characteristic values 276. In various implementations, the input layer 320 includes a number of LSTM logic units 320a, which are also referred to as model(s) of neurons by those of ordinary skill in the art. In some such implementations, an input matrix from the features to the LSTM logic units 320a includes rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3B, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of candidate directives. In some implementations, the number of candidate directives is approximately equal to the number of possible directives 360. In some implementations, the candidate directives are associated with corresponding confidence scores which include a probability or a confidence measure that the corresponding directive satisfies the corresponding objective 254. In some implementations, the outputs do not include directives that have been excluded by operation of the limiter 370.

In some implementations, the directive selector 328 generates the directives 274 by selecting the top N candidate directives provided by the classification layer 326. For example, in some implementations, the directive selector 328 selects the candidate directives with the highest confidence score. In some implementations, the top N candidate directives are most likely to satisfy the objectives 254. In some implementations, the directive selector 328 provides the directives 274 to a rendering and display pipeline (e.g., the display engine 260 shown in FIG. 2).

Figure 4A:
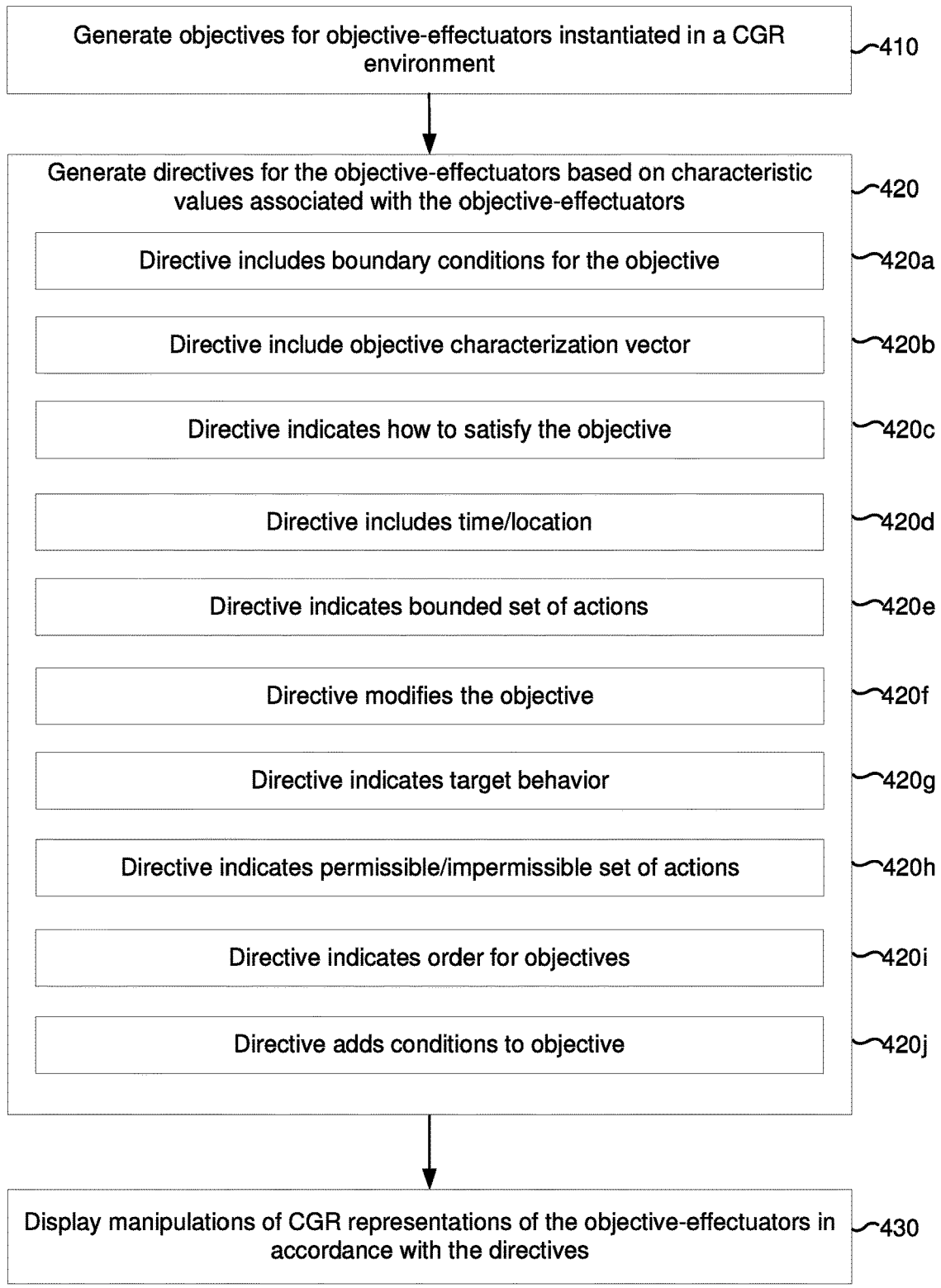
FIGS. 4A-4B are flowchart representations of a method of generating directives for objective-effectuators in accordance with some implementations.

FIG. 4A is a flowchart representation of a method 400 of generating directives for objective-effectuators. In various implementations, the method 400 is performed by a device with a non-transitory memory and one or more processors coupled with the non-transitory memory (e.g., the controller 102 and/or the electronic device 103 shown in FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 410, in various implementations, the method 400 includes generating, in coordination with an emergent content engine, a first objective for a first objective-effectuator and a second objective for a second objective-effectuator instantiated in a computer-generated reality (CGR) environment. For example, as illustrated in FIG. 2A, the director 270 generates the first directive 274a for the boy character engine 208a and the second directive 274b for the girl character engine 208b. In some implementations, the first and second objectives are associated with a mutual plan. For example, as illustrated in FIG. 2A, the first directive 274a and the second directive 274b are associated with the mutual plan 259.

As represented by block 420, in various implementations, the method 400 includes generating, based on characteristic values associated with the first and second objective-effectuators, a first directive for the first objective-effectuator and a second directive for the second objective-effectuator. For example, as illustrated in FIG. 2A, the director 270 generates the first directive 274a and the second directive 274b based on the characteristic values 276 associated with the boy objective-effectuator and the girl objective-effectuator. In some implementations, the first directive limits actions generated by the first objective-effectuator over a first set of one or more time frames associated with the first objective and the second directive limits actions generated by the second objective-effectuator over a second set of one or more time frames associated with the second objective.

As represented by block 420a, in some implementations, the first directive includes a first set of boundary conditions for the first objective, and the second directive includes a second set of boundary conditions for the second objective. For example, as illustrated in FIG. 2B, the first directive 274a includes the boundary conditions 280a and 280b.

As represented by block 420b, in some implementations, the first directive includes a first objective characterization vector that characterizes the first objective in order to limit a scope of the first objective, and the second directive includes a second objective characterization vector that characterizes the second objective in order to limit a scope of the second objective. For example, as illustrated in FIG. 2C, the objective characterization vector 282 limits the scope of an objective.

As represented by block 420c, in some implementations, the first directive indicates how to satisfy the first objective, and the second directive indicates how to satisfy the second objective. In some implementations, the directives include guidance on how to satisfy the corresponding objectives. In some implementations, the directives include vague guidance (e.g., the directives narrow the objectives by less than a threshold amount). In some implementations, the directives includes specific guidance (e.g., the directives narrow the objectives by more than a threshold amount).

As represented by block 420d, in some implementations, the first directive indicates a first time for satisfying the first objective, and the second directive indicates a second time for satisfying the second objective. For example, as illustrated in FIG. 2C, the objective characterization vector 282 includes a time 282a. In some implementations, the first directive indicates a first location within the CGR environment for satisfying the first objective, and the second directive indicates a second location within the CGR environment for satisfying the second objective. For example, as illustrated in FIG. 2C, the objective characterization vector 282 includes a location 282b.

As represented by block 420e, in some implementations, the first directive indicates a first bounded set of actions to satisfy the first objective, and the second directive indicates a second bounded set of actions to satisfy the second objective. For example, as illustrated in FIG. 2C, the objective characterization vector 282 includes bounded actions 282c.

As represented by block 420f, in some implementations, the method 400 includes determining whether the first objective breaches the mutual plan, and in response to determining that the first objective breaches the mutual plan, generating the first directive to modify the first objective. In some implementations, modifying the first objective includes blocking the first objective, demoting the first objective, or dampening the first objective. In some implementations, the first directive modifies the first objective in order to satisfy the mutual plan. In some implementations, the first directive modifies the first objective in order to intertwine the first objective with the second objective (e.g., in order to create conflicts between the objective-effectuators). For example, as illustrated in FIG. 2C, the objective characterization vector 282 includes an objective modification 282e that modifies the objective.

As represented by block 420g, in some implementations, the first directive indicates a first target behavior for the CGR representation of the first objective-effectuator while advancing towards the first objective, and the second directive indicates a second target behavior for the CGR representation of the second objective-effectuator while advancing towards the second objective (e.g., fight honorably and not dirty, talk to your teacher in a respectful tone and not an argumentative tone, etc.). For example, as illustrated in FIG. 2C, the objective characterization vector 282 includes the target behavior 282f.

As represented by block 420h, in some implementations, the first directive indicates a first permissible set of actions for the CGR representation of the first objective-effectuator, and the second directive indicates a second permissible set of actions for the CGR representation of the second objective-effectuator. For example, as illustrated in FIG. 2C, the objective characterization vector 282 includes a set of permissible actions 282g.

As represented by block 420*i*, in some implementations, the first objective includes a plurality of objectives, and the first directive orders the plurality of objectives into a sequence that satisfies the mutual plan. For example, an objective-effectuator pursues a first objective, then concurrently pursues a second objective and a third objective. In some examples, a character objective-effectuator's first objective is to learn how to fight, and the character objective-effectuator's second and third objectives are to fight the bad guys and save the girl. For example, as illustrated in FIG. 2C, the objective characterization vector 282 includes the objective priority 282*h*.

As represented by block 420*j*, in some implementations, the first objective includes a plurality of objectives, and the first directive makes one of the plurality of objectives conditional upon satisfaction of another one of the plurality of objectives. For example, an objective-effectuator pursues a first objective, if the second objective is at least 50% satisfied. In some examples, a character objective-effectuator tries to fight the bad guys if the character objective-effectuator has completed at least half of a fighting lesson plan. For example, as illustrated in FIG. 2C, the objective characterization vector 282 includes objective conditions 282*i*.

Figure 4B:
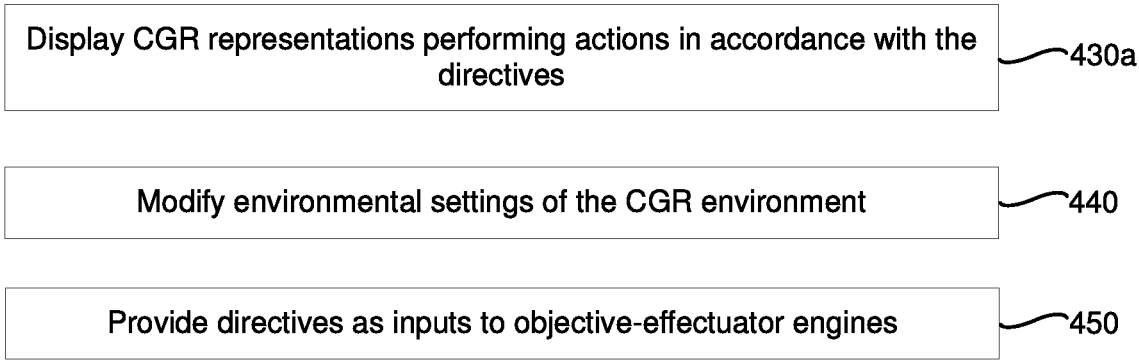

As represented by block 430, in various implementations, the method 400 includes displaying manipulations of CGR representations of the first and second objective-effectuators in the CGR environment in accordance with the first and second directives. Referring to FIG. 4B, as represented by block 430*a*, in some implementations, the method 400 includes displaying the manipulations includes displaying the CGR representations of the first and second objective-effectuators performing actions in accordance with the first and second directives. In some implementations, the method 400 includes animating (e.g., manipulating) the CGR representation of the first objective-effectuator in order to provide an appearance that the CGR representation of the first objective-effectuator is performing actions in accordance with the first directive. Similarly, in some implementations, the method 400 includes animating (e.g., manipulating) the CGR representation of the second objective-effectuator in order to provide an appearance that the CGR representation of the second objective-effectuator is performing actions in accordance with the second directive.

As represented by block 440, in some implementations, the method 400 includes modifying environmental settings of the CGR environment in order to trigger the CGR representations of the first and second objective-effectuators to satisfy the first and second objectives in accordance with the first and second directives. For example, as illustrated in FIG. 2C, the objective characterization vector 282 includes the environmental settings 282*d*. In some implementations, the method 400 includes modifying an environment of the CGR environment in order to trigger a change in actions of the CGR representations of the first and second objective-effectuators.

As represented by block 450, in some implementations, the method 400 includes providing the first directive as an input to a first objective-effectuator engine that generates actions for the CGR representation of the first objective-effectuator, and providing the second directive as an input to a second objective-effectuator engine that generates actions for the CGR representation of the second objective-effectuator. For example, as illustrated in FIG. 2A, the director 270 provides the first directive 274*a* to the boy character engine 208*a*, and the second directive 274*b* to the girl character engine 208*b*.

Figure 5:
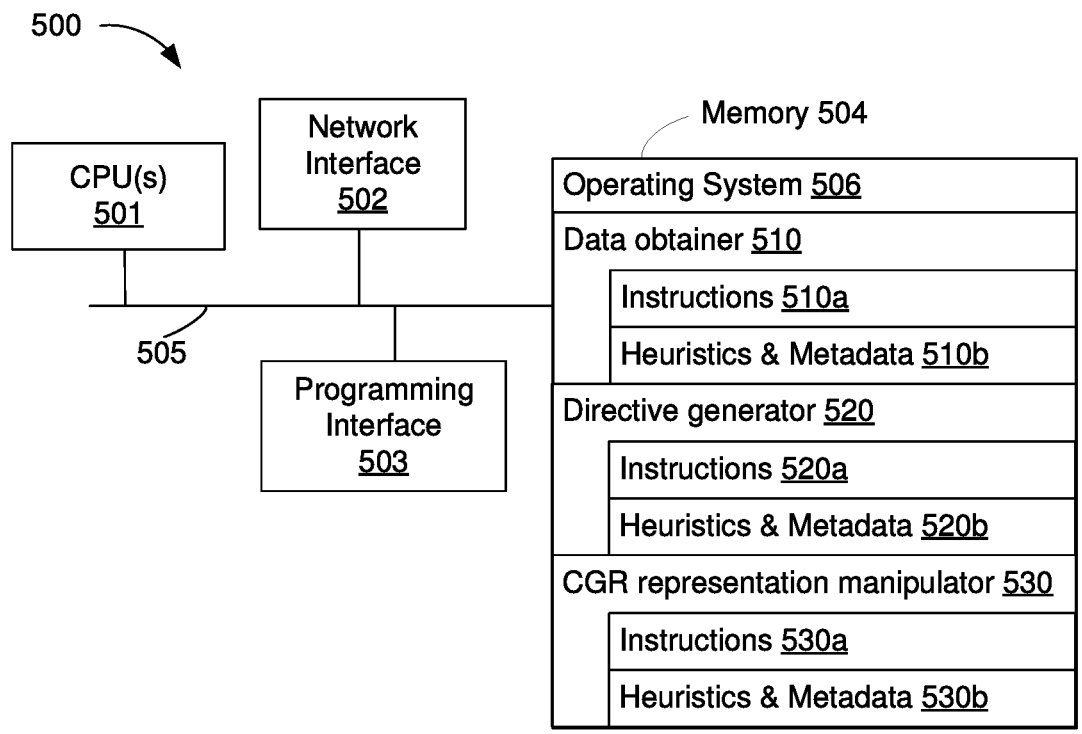
FIG. 5 is a block diagram of a device enabled with various components of the director in accordance with some implementations.

FIG. 5 is a block diagram of a device 500 enabled with one or more components of a director (e.g., the director 270 shown in FIG. 2A, or the director 300 shown in FIG. 3A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a data obtainer 510, a directive generator 520, and a CGR representation manipulator 530. In various implementations, the device 500 performs the method 400 shown in FIGS. 4A-4B.

In some implementations, the data obtainer 510 obtains objectives for objective-effectuators instantiated in a CGR environment. In some implementations, the data obtainer 510 performs the operation(s) represented by block 410 in FIG. 4A. To that end, the data obtainer 510 includes instructions 510*a*, and heuristics and metadata 510*b*.

In some implementations, the directive generator 520 generates directives for the objective-effectuators based on characteristic values associated with the objective-effectuators. In some implementations, the directive generator 520 performs the operations(s) represented by blocks 420, 440, and 450 shown in FIGS. 4A and 4B. To that end, the directive generator 520 includes instructions 520*a*, and heuristics and metadata 520*b*.

In some implementations, the CGR representation manipulator 530 displays manipulations of CGR representations of objective-effectuators in accordance with the directives. In some implementations, the CGR representation manipulator 530 performs the operations represented by blocks 430 and 430*a* shown in FIGS. 4A and 4B, respectively. To that end, the CGR representation manipulator 530 includes instructions 530*a*, and heuristics and metadata 530*b*.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a non-transitory memory and one or more processors coupled with the non-transitory memory:
      generating, in coordination with an emergent content engine, a first objective for a first objective-effectuator and a second objective for a second objective-effectuator instantiated in a computer-generated reality (CGR) environment, wherein the first and second objectives are associated with a mutual plan;
      generating, based on characteristic values associated with the first and second objective-effectuators, a first directive for the first objective-effectuator and a second directive for the second objective-effectuator, wherein the first directive limits actions generated by the first objective-effectuator over a first set of one or more time frames associated with the first objective and the second directive limits actions generated by the second objective-effectuator over a second set of one or more time frames associated with the second objective; and
      displaying manipulations of CGR representations of the first and second objective-effectuators in the CGR environment in accordance with the first and second directives.

2. The method of claim 1, wherein the first directive includes a first objective characterization vector that characterizes the first objective in order to limit a scope of the first objective, and the second directive includes a second objective characterization vector that characterizes the second objective in order to limit a scope of the second objective.

3. The method of claim 1, wherein the first directive indicates a first time for satisfying the first objective, and the second directive indicates a second time for satisfying the second objective.

4. The method of claim 1, further comprising:
   modifying environmental settings of the CGR environment in order to trigger the CGR representations of the first and second objective-effectuators to satisfy the first and second objectives in accordance with the first and second directives.

5. The method of claim 1, further comprising:
   determining whether the first objective breaches the mutual plan; and
   in response to determining that the first objective breaches the mutual plan, generating the first directive to modify the first objective.

6. The method of claim 1, wherein the first directive indicates a first target behavior for the CGR representation of the first objective-effectuator while advancing towards the first objective, and the second directive indicates a second target behavior for the CGR representation of the second objective-effectuator while advancing towards the second objective.

7. The method of claim 1, further comprising:
   modifying an environment of the CGR environment in order to trigger a change in actions of the CGR representations of the first and second objective-effectuators.

8. The method of claim 1, further comprising:
   providing the first directive as an input to a first objective-effectuator engine that generates actions for the CGR representation of the first objective-effectuator; and
   providing the second directive as an input to a second objective-effectuator engine that generates actions for the CGR representation of the second objective-effectuator.

9. The method of claim 1, wherein displaying the manipulations includes displaying the CGR representations of the first and second objective-effectuators performing actions in accordance with the first and second directives.

10. The method of claim 1, wherein the first objective includes a plurality of objectives, and the first directive orders the plurality of objectives into a sequence that satisfies the mutual plan.

11. A device comprising:
   one or more processors;
   a non-transitory memory;
   one or more displays; and
   one or more programs stored in the non-transitory memory, which, when executed by the one or more processors, cause the device to:

generate, in coordination with an emergent content engine, a first objective for a first objective-effectuator and a second objective for a second objective-effectuator instantiated in a computer-generated reality (CGR) environment, wherein the first and second objectives are associated with a mutual plan;

generate, based on characteristic values associated with the first and second objective-effectuators, a first directive for the first objective-effectuator and a second directive for the second objective-effectuator, wherein the first directive limits actions generated by the first objective-effectuator over a first set of one or more time frames associated with the first objective and the second directive limits actions generated by the second objective-effectuator over a second set of one or more time frames associated with the second objective; and display manipulations of CGR representations of the first and second objective-effectuators in the CGR environment in accordance with the first and second directives.

12. The device of claim 11, wherein the first directive includes a first set of boundary conditions for the first objective, and the second directive includes a second set of boundary conditions for the second objective.

13. The device of claim 11, wherein the first directive indicates how to satisfy the first objective, and the second directive indicates how to satisfy the second objective.

14. The device of claim 11, wherein the first directive indicates a first location within the CGR environment for satisfying the first objective, and the second directive indicates a second location within the CGR environment for satisfying the second objective.

15. The device of claim 11, wherein the first directive indicates a first bounded set of actions to satisfy the first objective, and the second directive indicates a second bounded set of actions to satisfy the second objective.

16. The device of claim 11, wherein the one or more programs further cause the device to:
determine whether the first objective breaches the mutual plan; and
in response to determining that the first objective breaches the mutual plan, generate the first directive to modify the first objective.

17. The device of claim 16, wherein modifying the first objective includes blocking the first objective, demoting the first objective, or dampening the first objective.

18. The device of claim 11, wherein the first directive indicates a first permissible set of actions for the CGR representation of the first objective-effectuator, and the second directive indicates a second permissible set of actions for the CGR representation of the second objective-effectuator.

19. The device of claim 11, wherein the first directive modifies the first objective in order to satisfy the mutual plan.

20. The device of claim 11, wherein the first directive modifies the first objective in order to intertwine the first objective with the second objective.

21. A non-transitory memory storing one or more programs, which, when executed by one or more processors of a device with a display, cause the device to:
generate, in coordination with an emergent content engine, a first objective for a first objective-effectuator and a second objective for a second objective-effectuator instantiated in a computer-generated reality (CGR) environment, wherein the first and second objectives are associated with a mutual plan;

generate, based on characteristic values associated with the first and second objective-effectuators, a first directive for the first objective-effectuator and a second directive for the second objective-effectuator, wherein the first directive limits actions generated by the first objective-effectuator over a first set of one or more time frames associated with the first objective and the second directive limits actions generated by the second objective-effectuator over a second set of one or more time frames associated with the second objective; and display manipulations of CGR representations of the first and second objective-effectuators in the CGR environment in accordance with the first and second directives.

22. The non-transitory memory of claim 21, wherein the first directive includes a first set of boundary conditions for the first objective, and the second directive includes a second set of boundary conditions for the second objective.

23. The non-transitory memory of claim 21, wherein the first directive includes a first objective characterization vector that characterizes the first objective in order to limit a scope of the first objective, and the second directive includes a second objective characterization vector that characterizes the second objective in order to limit a scope of the second objective.

24. The non-transitory memory of claim 21, wherein the first directive indicates how to satisfy the first objective, and the second directive indicates how to satisfy the second objective.

25. The non-transitory memory of claim 21, wherein the first directive indicates a first time for satisfying the first objective, and the second directive indicates a second time for satisfying the second objective.

26. The non-transitory memory of claim 21, wherein the first directive indicates a first location within the CGR environment for satisfying the first objective, and the second directive indicates a second location within the CGR environment for satisfying the second objective.

27. The non-transitory memory of claim 21, wherein the one or more programs further cause the device to:
modify environmental settings of the CGR environment in order to trigger the CGR representations of the first and second objective-effectuators to satisfy the first and second objectives in accordance with the first and second directives.

28. The non-transitory memory of claim 21, wherein the first directive indicates a first target behavior for the CGR representation of the first objective effectuator while advancing towards the first objective, and the second directive indicates a second target behavior for the CGR representation of the second objective-effectuator while advancing towards the second objective.

29. The non-transitory memory of claim 21, wherein the first directive indicates a first permissible set of actions for the CGR representation of the first objective-effectuator, and the second directive indicates a second permissible set of actions for the CGR representation of the second objective-effectuator.

30. The non-transitory memory of claim 21, wherein the one or more programs further cause the device to:
provide the first directive as an input to a first objective-effectuator engine that generates actions for the CGR representation of the first objective-effectuator; and provide the second directive as an input to a second objective-effectuator engine that generates actions for the CGR representation of the second objective-effectuator.

31. The non-transitory memory of claim 21, wherein displaying the manipulations includes displaying the CGR representations of the first and second objective-effectuators performing actions in accordance with the first and second directives.

32. The non-transitory memory of claim 21, wherein the first objective includes a plurality of objectives, and the first directive orders the plurality of objectives into a sequence that satisfies the mutual plan.

* * * * *